US006499019B1

United States Patent
Yen et al.

(10) Patent No.: US 6,499,019 B1
(45) Date of Patent: Dec. 24, 2002

(54) ELECTRONIC PAYMENT DEVICE USING UNBALANCED BINARY TREE AND THE METHOD OF THE SAME

(76) Inventors: Sung-Ming Yen, 12$^{th}$ Fl., No. 216, Sec. 2, Tun-Hwa S. Rd., Taipei (TW); Chiung-Ying Huang, 12$^{th}$ Fl., No. 216, Sec. 2, Tun-Hwa S. Rd., Taipei (TW); Chien-Chung Yuan, 12$^{th}$ Fl., No. 216, Sec. 2, Tun-Hwa S. Rd., Taipei (TW); Jong-Ming Lee, 12$^{th}$ Fl., No. 216, Sec. 2, Tun-Hwa S. Rd., Taipei (TW)

( * ) Notice: Subject to any disclaimer, the term of this patent is extended or adjusted under 35 U.S.C. 154(b) by 0 days.

(21) Appl. No.: 09/344,066

(22) Filed: Jun. 25, 1999

(51) Int. Cl.$^7$ ................................................ G06F 17/60
(52) U.S. Cl. ............................ 705/67; 705/50; 705/64; 705/65; 705/69; 705/78
(58) Field of Search ................................ 705/1, 50, 51, 705/64, 65, 67, 68, 69, 75, 76, 78; 380/1, 28, 277; 713/177

(56) References Cited

U.S. PATENT DOCUMENTS 4,881,264 A * 11/1989 Merkle ........................ 713/177
5,872,844 A * 2/1999 Yacobi ........................ 705/69
6,339,765 B1 * 1/2002 Maher ......................... 705/41

FOREIGN PATENT DOCUMENTS

JP 410162085 A * 6/1998 ........... G06F/19/00

OTHER PUBLICATIONS

David Willis, Jan. 15, 1997, Network Computing, p54, "Villains in the Vault".*

* cited by examiner

Primary Examiner—Hyung-Sub Sough
Assistant Examiner—Calvin L Hewitt
(74) Attorney, Agent, or Firm—Ya-Chiao Chang, Esq.

(57) ABSTRACT

An electronic payment device and its method using an unbalanced binary tree are disclosed. The total unit n of the amount of money that user purchases is decomposed first into a Matrix of p rows×q columns. Then, a first one-way function $h_1$ and a second one-way function $h_2$ serve to define the one-way function operation of the first row and each column, respectively. When two numbers of operation times a and b are calculated by their formulas respectively, they are substituted into formula $X_k = h_2^b(h_1^a(X_{pq}))$. Namely, by the first one-way function $h_1$, a times of operation is performed, and then by the second one-way function $h_2$, b times of operation is performed, thus, a first data $X_k$ of current consumption can be derived rapidly. The present invention has only a few times of operation, thus the calculating efficiency is improved greatly.

15 Claims, 7 Drawing Sheets

ELECTRONIC PAYMENT DEVICE USING UNBALANCED BINARY TREE AND THE METHOD OF THE SAME

FIELD OF THE INVENTION

The present invention relates to an electronic payment system in electronic commerce of network, and especially to a system using an unbalanced binary tree structure to calculate. The network used includes an Internet, a telephone network, a dedicated network, a cable TV network, etc.

BACKGROUND OF THE INVENTION

The basic structure of an electronic payment system 10 is illustrated in FIG. 1. A subscribe computer 1 and a merchant computer 2 perform data communication for completing a transaction through an Internet 3 (or other network). In general, the action of transferring account or verification for security is performed through an electronic payment service center 4 (for example, banks). In FIG. 2, the subscribe computer 1 purchases the total unit n by paying an amount of money to the electronic payment service center 4 and is awarded with an authority. Then, the total unit n is operated by a one-way function h to obtain a contrast data M. If the user desires to consume, the subscribe computer 1 firstly subtracts the unit spent, and uses the current unit k to calculate a value $X_k$ representing current consumption state to the amount of money. These datum (M and $X_k$) is sent to the merchant computer 2 through the Internet 3. In a reprocessing procedure P, the merchant computer 2 calculates a second value $X'_k$ using identical one-way function h. In the conventional operating process of the subscribe computer 1 with respect to the values M and $X_k$, a payment chain of one-way hash function shown in FIG. 3 is used, which has the relation of a one-way function $X_{n-1}=h(X_n)$. It means that the value $X_n$ is substituted into a one-way hash function h to operate as a one-dimension function or obtaining the next value $X_{n-1}$. As shown in this figure, in the subscribe computer 1, starting from substituting the initial value of a random number $X_n$ into an one-way hash function h to perform n times for deriving a contrast data M or to perform n-k times for deriving $X_k$. Then, in the reprocessing procedure P of the merchant computer 2, by the same one-way hash function h, $X_k$ is operated to generate $X'_k$ and then the value $X'_k$ is contrasted with data M. If $X'_k$=M, it identifies this transaction is successful, thus the merchant computer 2 provides services or merchandises to the subscriber and requests a transferring account to the electronic payment service center 4, thus storing current $X_k$ as a contrast value M for being used in next consumption.

Since the one-way hash function is irreversible, any $X_k$ only operates in a forward direction (the leftward direction in FIG. 3). Therefore, for each consumption. (with different k value, and value k is increased monotonically to value n), the subscribe computer 1 calculates from $X_n$ to $X_k$ for n-k times. For example, assuming one unit of money is consumed each time, thus, n-1 times of function operation are necessary to calculate from $X_n$ to $X_1$. In the next consumption, from $X_n$ to $X_2$ similarly, n-2 times of operation are necessary. In further next consumption, from $X_n$ to $X_3$ n-3 times of operation is necessary. And for $X_{n-1}$, only one time of operation from $X_n$ is necessary. Thus, in the conventional calculation, totally, (n-1)+(n-2)+ . . . +1 times of functional operation are performed, and then this total value is divided by n to obtain an average of $$\frac{(n-1)}{2}$$

times for each consumption. For such a large amount of operations, the subscribe computer 1 with a finite ability of hardware (for example, an IC card) is insufficient. Therefore, the operation efficiency becomes low. The larger the unit of purchase, the lower the operation efficiency. Thus, the prior art only can be used in an electronic payment system with a smaller amount of money.

SUMMARY OF INVENTION

Accordingly, the primary object of the present invention is to provide an electronic payment device using an unbalanced binary tree for improving the calculating efficiency of an electronic payment system.

Another object of the present invention is to provide an electronic payment device using an unbalanced binary tree for reducing the operation times of an electronic payment system.

Another object of the present invention is to provide an article of manufacture comprising a medium contained a computer readable program, which can be used in the electronic payment device using an unbalanced binary tree of the present invention for improving the calculating efficiency.

In order to attain the aforementioned objects, in the electronic payment system of the present invention, an operation device is installed in a computer comprising a data providing device for providing datum including the total unit n of the amount of money that user purchases, a first one-way function $h_1$, a second one-way function $h_2$, and the current unit k of the amount of money after current consumption; and a microprocessor. The microprocessor includes a first processing device for selecting two positive integers p and q which conforming the relation p×q=n; a random number generator for generating a random number and setting the random number as an initial value $X_{pq}$; a second processing device to calculate the number a of times of the first one-way function $h_1$ by formula $$a = q - \left\lceil \frac{k}{p} \right\rceil;$$

a third processing device to calculate the number b of times of the second one-way function $h_2$ by formula b=[p-(k mod p)] mod p; and a fourth processing device to derive a first data $X_k$ by formula $X_k=h_2^b(h_1^a(X_{pq}))$. Thereby, the first data $X_k$ of current consumption, or a plurality of contrast values $M_q$ are calculated. After the first data $X_k$ and the contrast values $M_q$ being sent to a merchant computer through a network, the merchant computer performs a reprocess procedure to the first data $X_k$ to form with a second data $X'_k$, and checking whether the respective contrast value $M_q$ is equal to the second data $X'_k$, so as to determine whether this transaction is successful.

The data providing device of the present invention is a storing device (such as ROM, hard disk), or an input device (such as a modem) reading data from a network.

It is suggested that the first one-way function $h_1$ and the second one-way function $h_2$ of the present invention are one-way Hash functions, for example, a MD-5 algorithm, a RIPE-MD algorithm, a SHA-1 algorithm, a MDC2 algorithm, or a MDC4 algorithm, etc. It is preferred that the first and second one-way functions $h_1$, $h_2$ are RIPE-MD algorithm, SHA-1 algorithm, respectively. They have the advantages of short data length and preferred reliability.

In the present invention, the operating device can be installed within the subscriber's computer or the merchant computer. The operating device can be made as an IC card itself (such as a Smart IC card), or the device can be modularized as a chip. Preferably, the procedure of the method of the present invention can be encoded in a medium to serve as a computer readable program to perform the calculation with the unbalanced binary tree. Of course, it can be used in a reprocessing procedure of the merchant computer for reducing operation times and thus improving the operating efficiency.

DESCRIPTION OF PREFERRED EMBODIMENT

Figure 1:
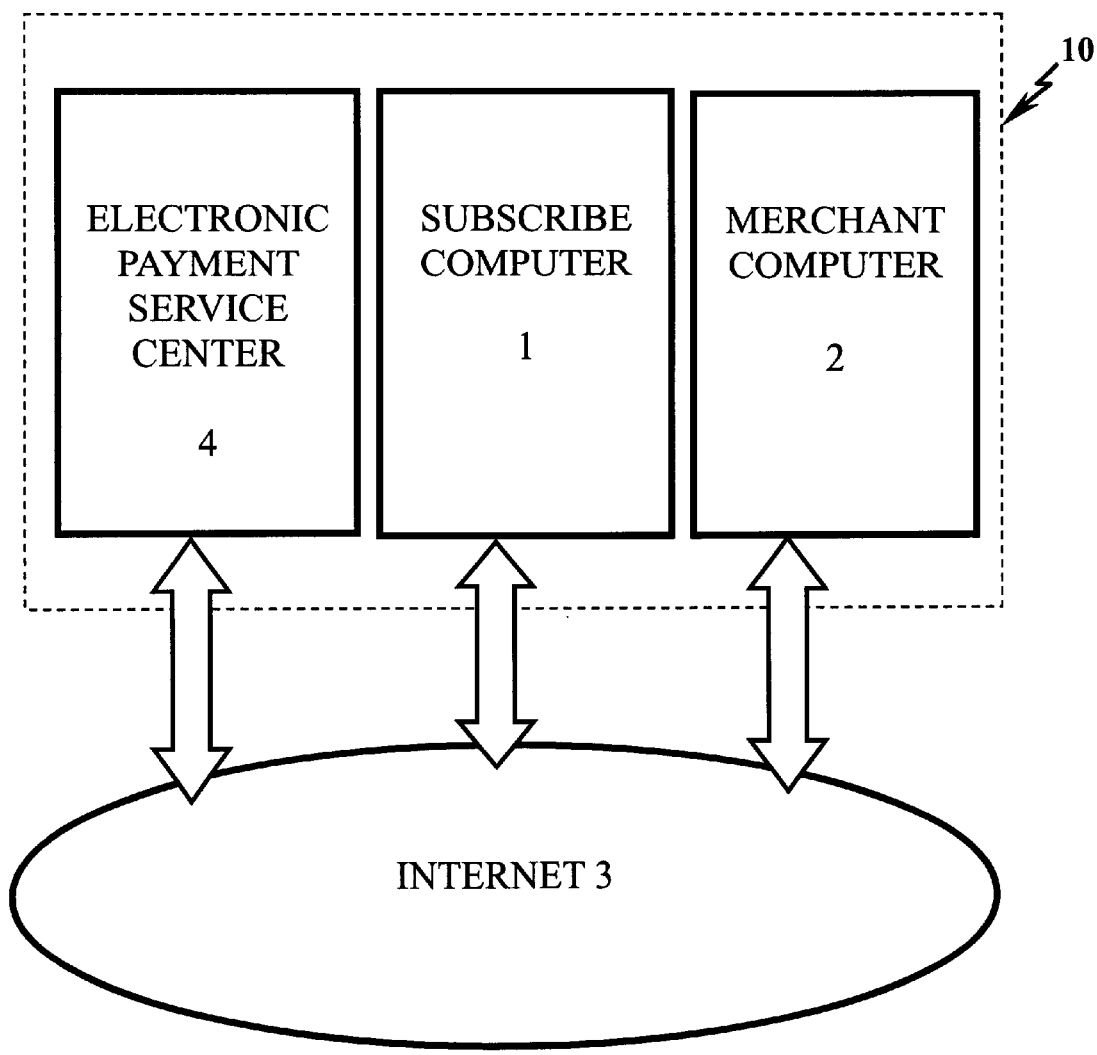
FIG. 1 shows a basic structure of an electronic payment system.
Figure 2:
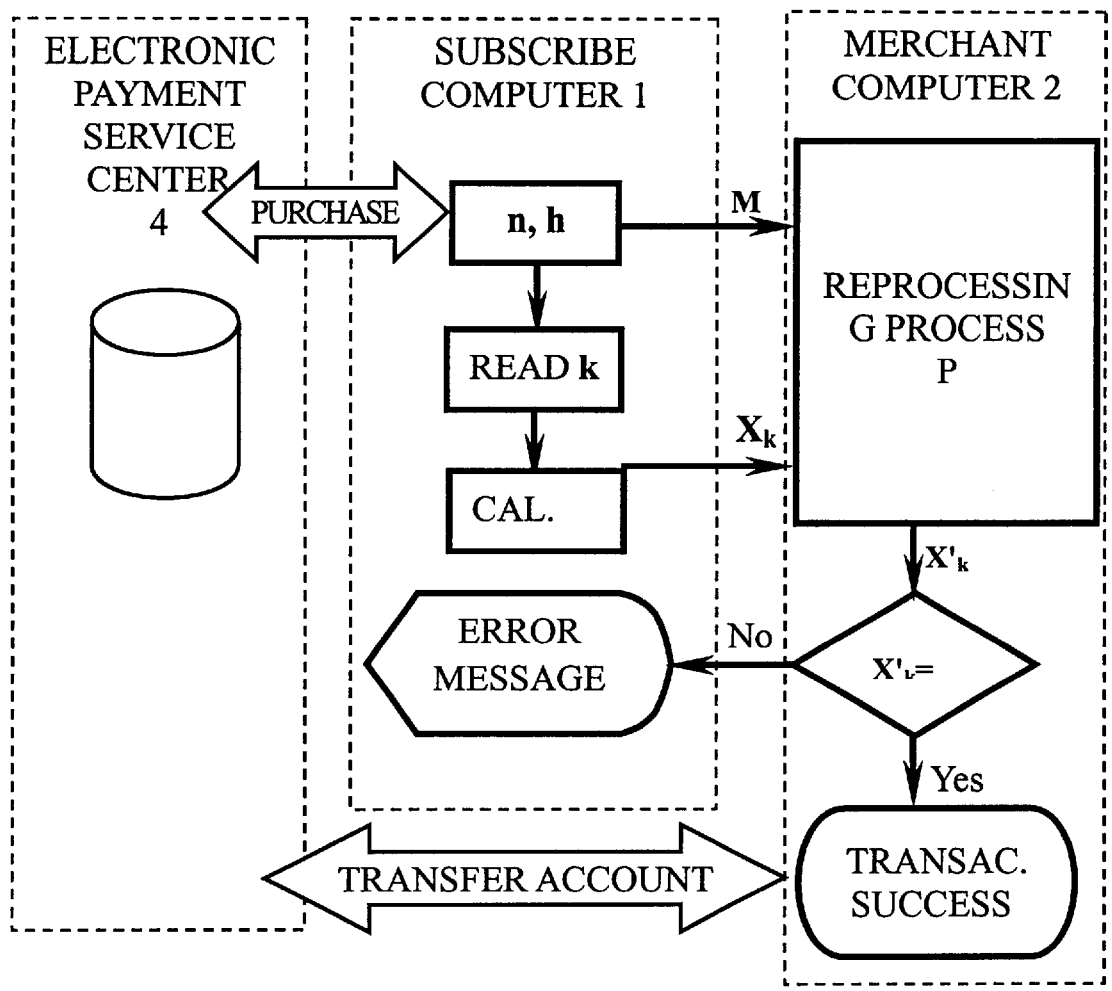
FIG. 2 shows the flow chart about the transaction of an electronic payment system.
Figure 3:
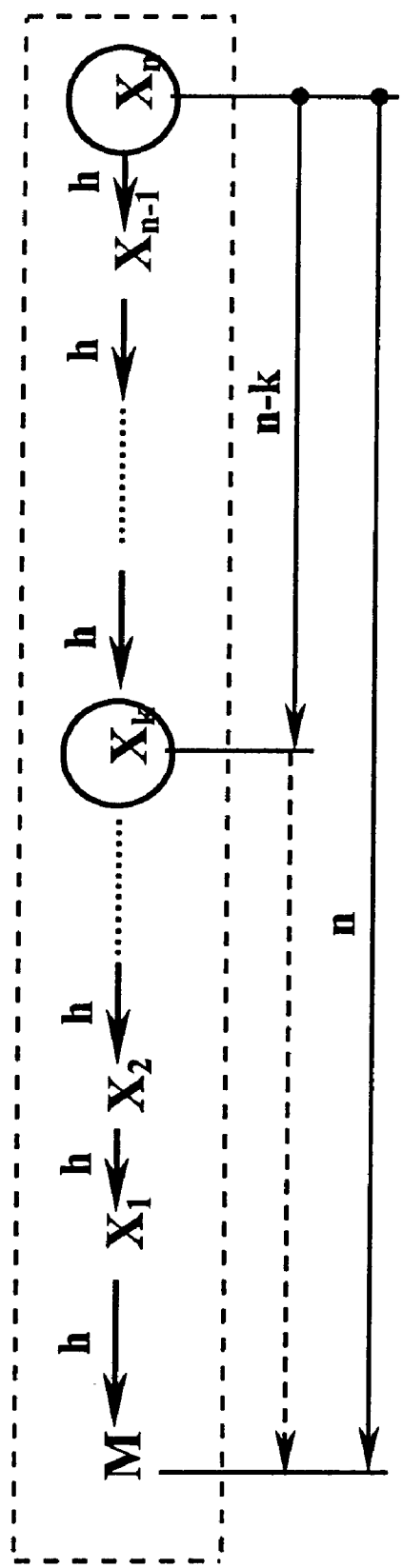
FIG. 3 is a schematic view showing the operating process of an one dimensional one-way hash function.
Figure 4:
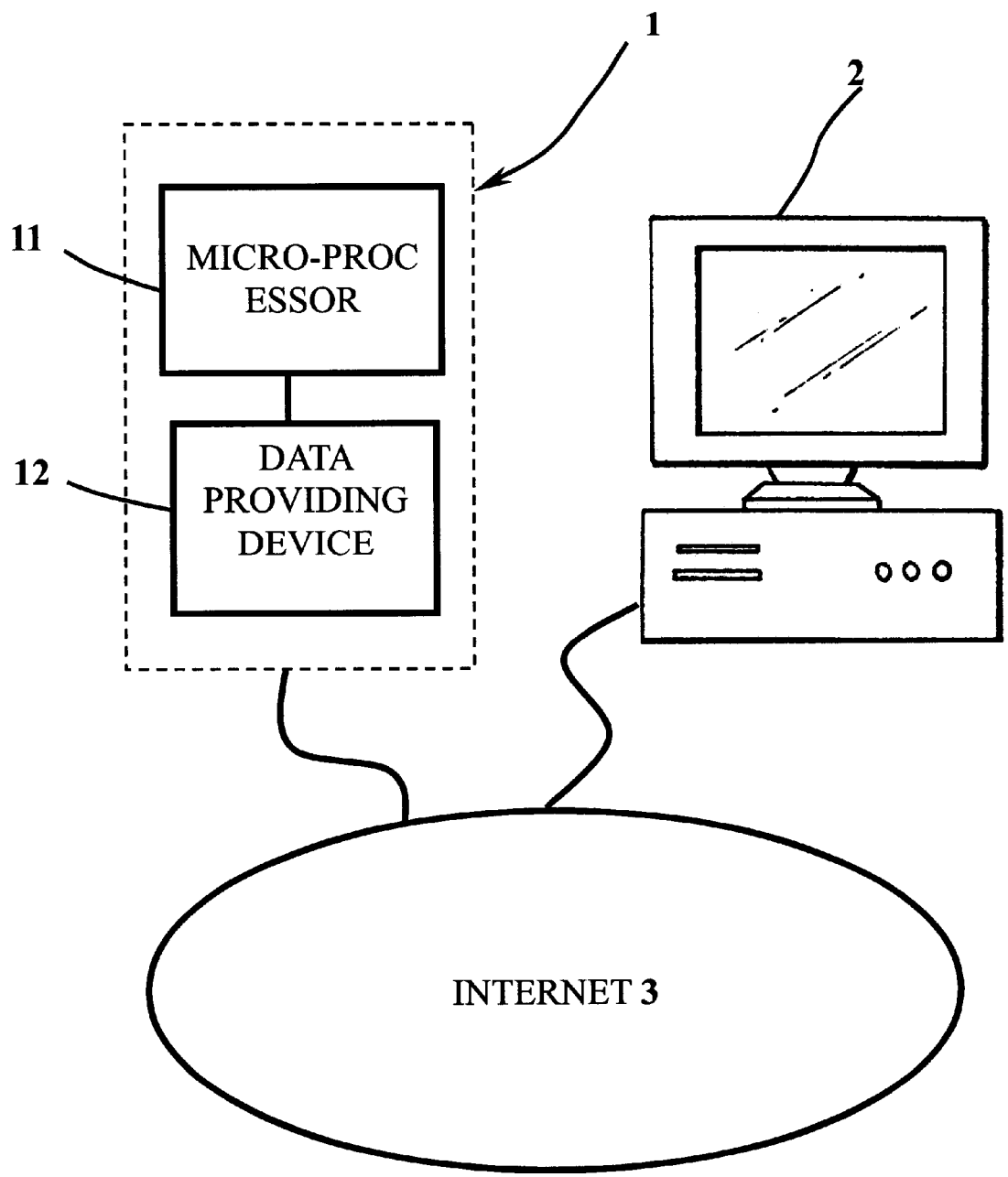
FIG. 4 shows the structure of the operating device according to the present invention.

With reference to FIG. 4, the operating device of the present invention is installed at subscriber's computer 1, and includes a data providing device 12 and a microprocessor 1. The data providing device 12 may be a memory, such as ROM, hard disk, or a modem connected to an Internet 3 for providing data. In this embodiment, an Internet 3 serves to exchange data (it also can be sent by a telephone network, a dedicated network, a cable TV network, or other equivalent network).

Figure 5:
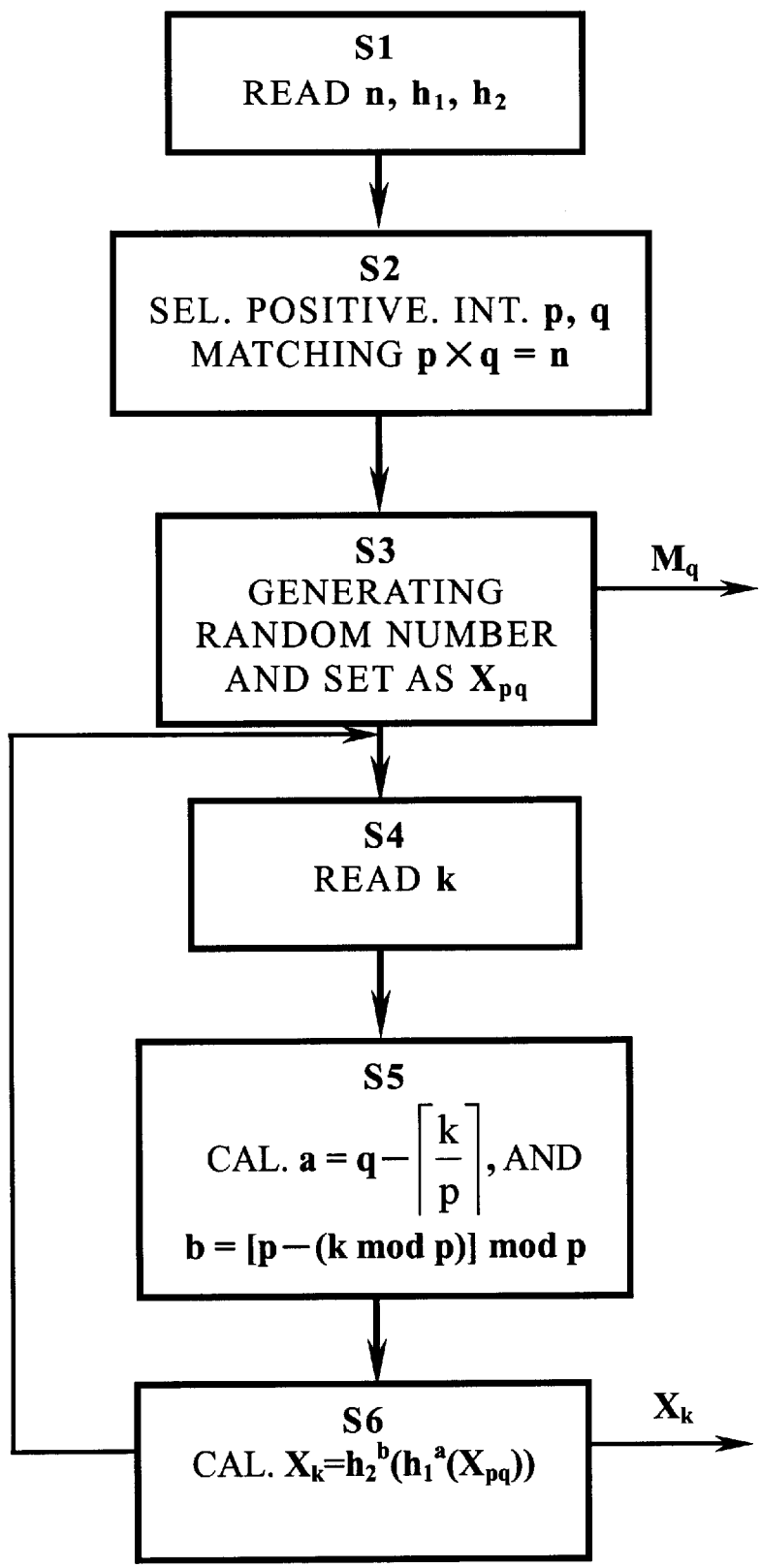
FIG. 5 shows the flow chart of the calculating method in the present invention.

Referring to FIG. 5, step S1 to S3 are initialization operations, and step S4 to S6 shows the operating process of the present invention. The microprocessor 11 reads or receives datum including the total unit n of the amount of money that user purchases, first one-way function $h_1$ and second one-way function $h_2$ (step S1). Selecting two positive integers p and q so as to conform the relation p×q=n (step S2, the microprocessor 11 generates a random number and set as an initial value $X_{pq}$(step S3). Then, the current unit k of the amount of money after current consumption is read (step S4). Then formulas $$a = q - \left\lceil \frac{k}{p} \right\rceil$$

(formula A) and b=[p−(k mod p)] mod p (formula B) are served to calculate values a and b (step S5), and then they are substituted into formula $X_k = h_2^b(h_1^a(X_{pq}))$ (formula C) for obtaining a first data $X_k$ (step S6) where $$\left\lceil \frac{k}{p} \right\rceil$$

represents that the value k dividing by p is carried by one in any condition; (k mod p) represents the residue of k dividing by p; $h_1^a(X_{pq})$ represents that by the first one-way function $h_1$, a times of operation to value $X_{pq}$ is performed; $h_2^b(h_1^a(X_{pq}))$ represents by the second one-way function $h_2$, b times of operation is performed to $h_1^a(X_{pq})$. In next consumption, the next consumption unit k is read again, and the step S4 to S6 proceeds for deriving the next first data $X_k$ repeatedly.

Figure 6:
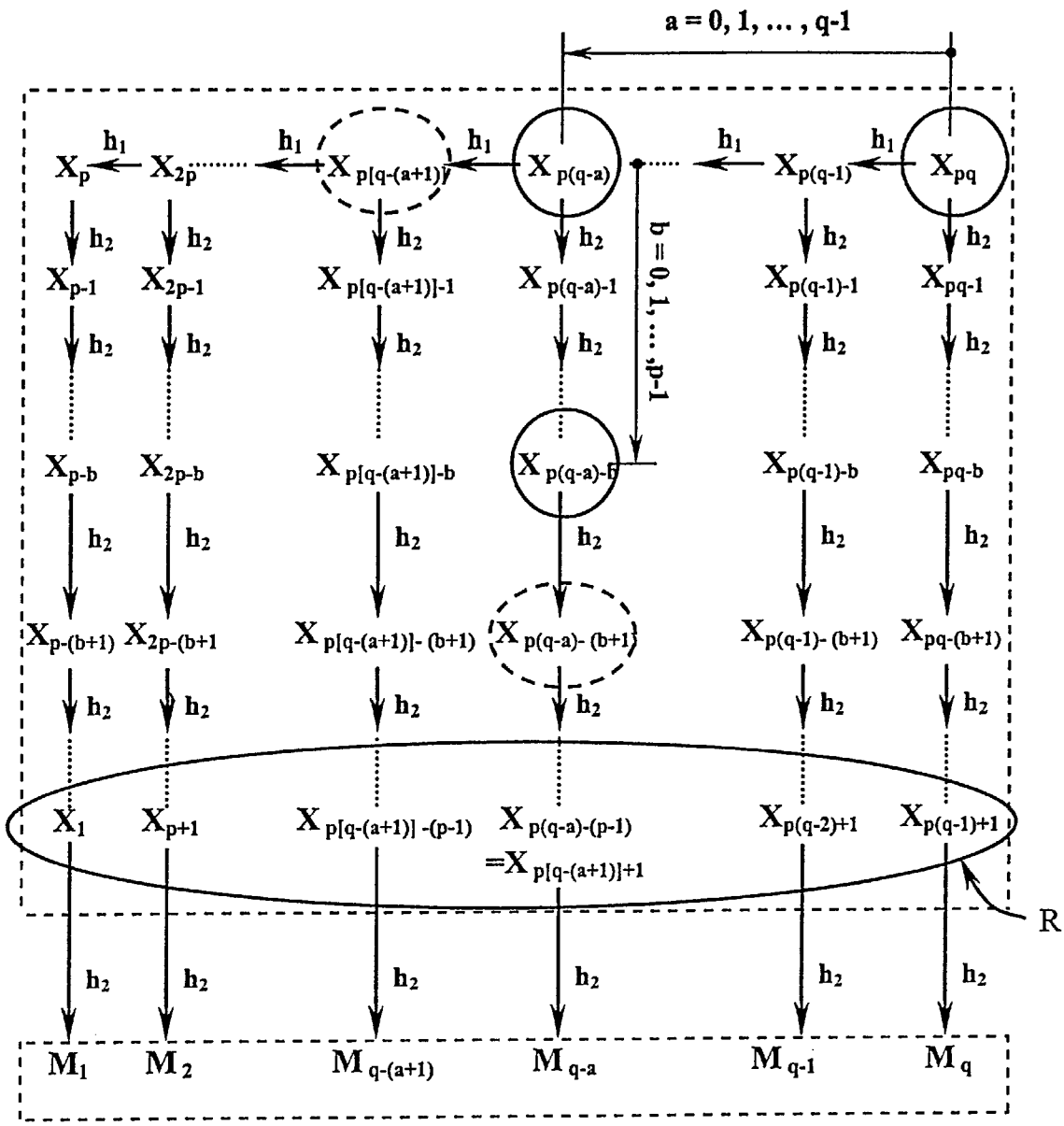
FIG. 6 is a schematic view showing the operating process of two dimensional one-way hash functions in the unbalanced binary tree structure.

The arithmetic meaning of the aforementioned steps is illustrated in FIG. 6. The datum including the total unit n of amount of money that user purchases is decomposed first into a matrix of p rows×q columns in step S2. Each node is represented by a general form $X_{p(q-a)-b}$, where "a" represents the line distance between the node and the initial value $X_{pq}$, and "b" represents the line distance between the node $X_{p(q-a)-b}$, and the initial value $X_{pq}$. The "a" and "b" can be calculated from the formula A and B in step S5 in this embodiment. The first one-way function $h_1$ defines as a function of a leftward operation one-way function for each node $X_{p(q-a)}$ in the first row (b=0), which may be a one-way hash function of RIPE-MD algorithm with an irreversible property of $h_1(X_{p(q-a)}) = X_{p[q-(a+1)]}$. The second one-way function $h_2$ defines as a function of a downward operation one-way function for each node $X_{p(q-a)-b}$, which may be a one-way hash function of SHA-1 algorithm with an irreversible property of $h_2(X_{p(q-a)-b}) = X_{p(q-a)-(b+1)}$. Therefore, in step 6, each node $X_k$ (with a general form $X_{p(q-a)-b}$) can be derived easily by a times of first one-way function $h_1$ operations and b times of second one-way function $h_2$ operations to the initial value $X_{pq}$. Thus, each node $X_{p(q-a)-(p-1)}$ in the last row (b=p−1) of the matrix can be operated easily so as to form a root sequence R. If each value in root sequence R is operated by one times of second one-way function $h_2$ operation, then q contrast values $M_q$ are obtained, where q=1,2,3 . . .

Since each node in the first row (b=0) except the leftmost node, having a longer left string than its right string, that's why it is named as an "Unbalanced Binary-Tree".

When consumption is occurred in Internet 3, the first data $X_k$ and contrast value $M_q$ are calculated and transferred to the merchant computer 2 through the Internet 3. The merchant computer 2 re-processes $X_k$ to become a second data $X'_k$ and check whether $X'_k = M_q$. The merchant computer 2 may store the first data $X_k$ as its contrast value $M_q$ for later use. Wherein, in the reprocess procedure P, the merchant computer 2 also can use the present invention to calculate the second data $X'_k$ from the first data $X_k$ rapidly.

Figure 7:
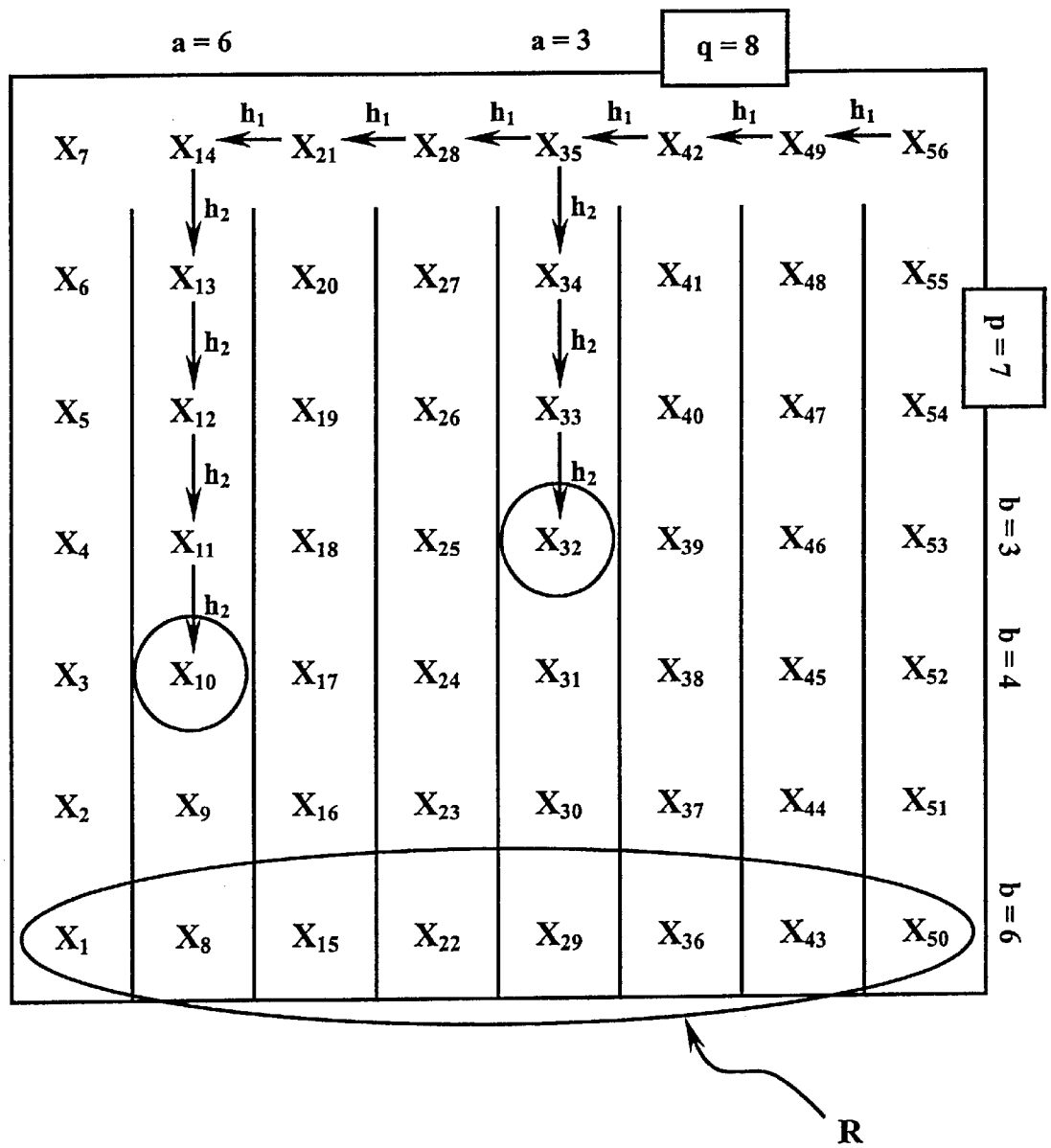
FIG. 7 is a schematic view showing the operating process of two embodiments.

FIG. 7 is two real embodiment illustrating the operation of the present invention. The first one-way function $h_1$ and the second one-way function $h_2$ are one-way hash function of RIPE-MD algorithm and SHA-1 algorithm respectively. In the first embodiment, assume that user purchases $11.2 for n=56 units (1 unit=$0.2). By the present invention above mentioned, the two positive integers p=7 rows, q=8 columns are selected (the closer the p and q, the better the operation efficiency). If the user consumes 10 units (K=10) at the first time, by the aforementioned formulas A and B, we obtains that a=6 times, b=4 times, these values are substituted into formula C for deriving $X_{10}$. Namely, totally, 10 times of operation are performed including 6 times of first one-way function $h_1$ operations and 4 times of second one-way function $h_2$ operations. However, this is more efficient than that in the prior art in which by the operation of a single one-way function, from $X_{56}$ to $X_{10}$, totally 56−10=46 times of operations are necessary. If in next time, 22 units are consumed, then, K=32, by the present invention, a=3 times, and b=3 times. Thus, only six times of operation is necessary for obtaining $X_{32}$. This is more efficient than that in the prior art in which by the operation of a single one-way function, from $X_{56}$ to $X_{32}$, totally 56−32=24 times of operations are necessary.

In practical, in the case that one unit of money consumed each time, the total operation times T of FIG. 6 is $$T = \sum_{a=0}^{q-1} \sum_{b=0}^{p-1} (a+b) = pq\left(\frac{p+q}{2} - 1\right).$$

Thus, the average operating efficiency is T divided by n which is equal to $$\left(\frac{p+q}{2}\right) - 1.$$

This value is less than the prior art in which $$\frac{(p \cdot q - 1)}{2}$$

times of operations is necessary. Therefore. the present invention has greatly improved the operating efficiency.

Although the present invention has been described using specified embodiment, the examples are meant to be illustrative and not restrictive. It is clear that many other variations would be possible without departing from the basic approach, demonstrated in the present invention. Therefore, all such variations are intended to be embraced within the scope of the invention as defined in the appended claims.

What is claimed is:

1. An electronic payment device using an unbalanced binary tree for using in a computer of an electronic payment system so as to calculate a first data $X_k$ of current consumption, or calculate a plurality of contrast values $M_q$, after said first data $X_k$ and said contrast values $M_q$ being sent to a merchant computer through a network, said merchant computer performing a reprocess procedure for said first data $X_k$ to form with a second data $X'_k$, and checking whether said respective contrast value $M_q$ is equal to said second data $X'_k$, so as to determine whether this transaction is successful, said electronic payment device primarily comprising:

a data providing means for providing datum including the total unit n of the amount of money that user purchases, a first one-way function $h_1$, a second one-way function $h_2$, and the current unit k of the amount of money after current consumption;

a first processing means for selecting two positive integers p and q which conforming the relation p×q=n;

a random number generator for generating a random number and setting said random number as an initial value $X_{pq}$;

a second processing means for calculating the number a of times of said first one-way function $h_1$ by formula $$a = q - \left\lceil \frac{k}{p} \right\rceil,$$

according to said two positive integers p and q and said current unit k of the amount of money after current consumption, where $$\left\lceil \frac{k}{p} \right\rceil$$

represents that said value k dividing by p is carried by one in any condition;

a third processing means for calculating the number b of times of said second one-way function $h_2$ by formula b=[p−(k mod p)] mod p, according to said positive integer p and said current unit k of the amount of money after current consumption, where (k mod p) represents the residue of k dividing by p; and a fourth processing means for calculating said first data $X_k$ by formula $X_k = h_2^b(h_1^a(X_{pq}))$, according to said numbers of times a and b, said first one-way function $h_1$, said second one-way function $h_2$, and said initial value $X_{pq}$, where $h_1^a(X_{pq})$ represents that said value $X_{pq}$ is operated by said first one-way function $h_1$ for a times, where $h_2^b(h_1^a(X_{pq}))$ represents that said value $h_1^a(X_{pq})$ is operated by said second one-way function $h_2$ for b times.

2. The electronic payment device using an unbalanced binary tree as claimed in claim 1, wherein said first one-way function $h_1$ and said second one-way function $h_2$ are different functions.

3. The electronic payment devices using an unbalanced binary tree as claimed in claim 1, wherein said first one-way function $h_1$ and said second one-way function $h_2$ are one-way hash functions.

4. The electronic payment device using an unbalanced binary tree as claimed in claim 3, wherein said one-way hash functions of said first one-way function $h_1$ and said second one-way function $h_2$ are RIPE-MD algorithm and SHA-1 algorithm, respectively.

5. The electronic payment device using an unbalanced binary tree as claimed in claim 1, wherein said network is an Internet.

6. An method for an electronic payment to be carried out by a computer of an electronic payment system using an unbalanced binary tree so as to calculate a first data $X_k$ of current consumption, or calculate a plurality of contrast values $M_q$, after said first data $X_k$ and said contrast values $M_q$ being sent to a merchant computer through a network, said merchant computer performing a reprocess procedure to said first data $X_k$ to form as a second data $X'_k$, and checking whether said respective contrast value $M_q$ is equal to said second data $X'_k$, so as to determine whether this transaction is successful, wherein said subscriber's computer reads or stores the datum including the total unit n of the amount of money that user purchases, a first one-way function $h_1$, a second one-way function $h_2$, and the current unit k of the amount of money after current consumption, said method primarily comprising the steps of:

(a) selecting two positive integers p and q which conforming the relation p×q=n;

(b) generating a random number and setting said random number as an initial value $X_{pq}$;

(c) calculating the number a of times of said first one-way function $h_1$ by formula $$a = q - \left\lceil \frac{k}{p} \right\rceil,$$

according to said two positive integers p and q and said current unit k of the amount of money after current consumption, where $$\left\lceil \frac{k}{p} \right\rceil$$

represents that the value k dividing by p is carried by one in any condition;

(d) calculating the number b of times of said second one-way function $h_2$ by formula b=[p−(k mod p)] mod p, according to said positive integer p and said current unit k of the amount of money after current consumption, where (k mod p) represents the residue of k dividing by p; and (e) calculating said first data $X_k$ by formula $X_k = h_2^b(h_1^a(X_{pq}))$, according to said numbers of times a and b, said first one-way function $h_1$, said second one-way function $h_2$, and said initial value $X_{pq}$, where $h_1^a(X_{pq})$ represents that said value $X_{pq}$ is operated by said first one-way function $h_1$ for a times, where $h_2^b(h_1^a(X_{pq}))$ represents that said value $h_1^a(X_{pq})$ is operated by said second one-way function $h_2$ for b times.

7. The method for an electronic payment to be carried out by a computer of an electronic payment system using an unbalanced binary tree as claimed in claim 6, wherein said first one-way function $h_1$ and said second one-way function $h_2$ are different functions.

8. The method for an electronic payment to be carried out by a computer of an electronic payment system using an unbalanced binary tree as claimed in claim 6, wherein said first one-way function $h_1$ and said second one-way function $h_2$ are one-way hash functions.

9. The method for an electronic payment to be carried out by a computer of an electronic payment system using an unbalanced binary tree as claimed in claim 8, wherein said one-way hash functions of said first one-way function $h_1$ and said second one-way function $h_2$ are RIPE-MD algorithm ad SHA-1 algorithm, respectively.

10. The method for an electronic payment to be carried out by a computer of an electronic payment system using an unbalanced binary tree as claimed in claim 6, wherein said network is an Internet.

11. An article of manufacture using in a computer of an electronic payment system, said article of manufacture comprising a medium containing a computer readable program so as to calculate a first data $X_k$ of current consumption, or calculate a plurality of contrast values $M_q$, after said first data $X_k$ and said contrast values $M_q$ being sent to a merchant computer through a network, said merchant computer performing a reprocess procedure to said first data $X_k$ to form with a second data $X'_k$, and checking whether said respective contrast value $M_q$ is equal to said second data $X'_k$, so as to determine whether this transaction is successful, said computer readable program primarily comprising:

first computer readable program code means for reading datum including the total unit n of the amount of money that user purchases, a first one-way function $h_1$, a second one-way function $h_2$, and the current unit k of the amount of money after current consumption;

second computer readable program code means for selecting two positive integers p and q which conforming the relation p×q=n;

third computer readable program codes for generating a random number and setting the random number as an initial value $X_{pq}$;

fourth computer readable program code means for calculating the number a of times of said first one-way function $h_1$ by formula $$a = q - \left\lceil \frac{k}{p} \right\rceil,$$

according to said two positive integers p and q and said current unit k of the amount of money after current consumption, where $$\left\lceil \frac{k}{p} \right\rceil$$

represents that the value k dividing by p is carried by one in any condition;

fifth computer readable program code means for calculating the number b of times of said second one-way function $h_2$ by formula b=[p−(k mod p)] mod p, according to said positive integers p and said current unit k, etc., where (k mod p) represents the residue of k dividing by p; and sixth computer readable program code means for calculating a first data $X_k$ by formula $X_k = h_2^b(h_1^a(X_{pq}))$, according to said numbers of times a and b, said first one-way function $h_1$, said second one-way function $h_2$, and said initial value $X_{pq}$, where $h_1^a(X_{pq})$ represents that said value $X_{pq}$ is operated by said first one-way function $h_1$ for a times, where $h_2^b(h_1^a(X_{pq}))$ represents that said value $h_1^a(X_{pq})$ is operated by said second one-way function $h_2$ for b times.

12. The article of manufacture as claimed in claim 11, wherein said first one-way function $h_1$ and said second one-way function $h_2$ are different functions.

13. The article of manufacture as claimed in claim 11, wherein said first one-way function $h_1$ and said second one-way function $h_2$ are one-way hash functions.

14. The article of manufacture as claimed in claim 13, wherein said one-way hash functions of said first one-way function $h_1$ and said second one-way function $h_2$ are RIPE-MD algorithm and SHA-1 algorithm, respectively.

15. The article of manufacture as claimed in claim 11, wherein said network is an Internet.

* * * * *

UNITED STATES PATENT AND TRADEMARK OFFICE
CERTIFICATE OF CORRECTION

PATENT NO. : 6,499,019 B1  Page 1 of 1
DATED : December 24, 2002
INVENTOR(S) : Sung-Ming Yen et al.

It is certified that error appears in the above-identified patent and that said Letters Patent is hereby corrected as shown below:

<u>Title page,</u>
Item [73], Assignee, should be inserted as follows:
-- Assignee:    Institute for Information Industry, Taipei, Taiwan, R.O.C. --

Signed and Sealed this

Fourth Day of May, 2004

JON W. DUDAS
*Acting Director of the United States Patent and Trademark Office*